United States Patent Office 3,702,280
Patented Nov. 7, 1972

3,702,280
NYLON PANELS
Norman Stewart Anderson, Manchester, England, assignor to Imperial Chemical Industries Limited, London, England
No Drawing. Filed Jan. 5, 1971, Ser. No. 104,161
Claims priority, application Great Britain, Jan. 16, 1970, 2,245/70
Int. Cl. B32b 3/26
U.S. Cl. 161—160       7 Claims

ABSTRACT OF THE DISCLOSURE

A panel comprising a nylon foam core formed integrally with a covering skin of nylon, the foam having an average pore size of less than 1.5 cm., skin thickness being 0.2 to 3 mm., overall thickness 2.5 to 25 mm., average density 0.2 to 0.9 g./cc. and the relationship of impact strength (S) to weight per unit area (W) being such that $$\frac{\log_{10} S}{W} > 2$$

Manufacture of such panels by a two-shot moulding process using a mould of adjustable thickness.

---

This invention relates to nylon panels.

Our U.K. Pat. No. 1,156,217 describes and claims a process for the production of articles having a cellular core and an unfoamed surface skin comprising injecting a predetermined amount of an unfoamable thermoplastic resin into mould cavity and subsequently, and before the central portion of said unfoamable thermoplastic resin has set, injecting a thermoplastic resin composition containing a blowing agent at a temperature at or above the activation temperature of the blowing agent into the charge of the unfoamable thermoplastic resin that is in the mould cavity and maintaining the composition within the cavity for sufficient time to allow or cause the foamable composition to foam and the thermoplastic materials to set.

Such a process is applicable to the production of panels from any thermoplastic material which may be injection moulded and blown into foam. The production of satisfactory nylon panels by the process has however been impeded by the difficulties encountered in manufacturing nylon foam of good quality. It is an object of the present invention to provide high quality nylon panels having a foamed cellular core and an unfoamed surface skin, and a process for the manufacture of such panels.

According to the invention a panel comprises a core of nylon material as hereinafter defined in foam form, said core being formed integrally with a covering skin of nylon material, the foam having an average pore diameter of less than 1.5 mm., preferably less than 0.75 mm., and being substantially free from pores greater than 3 mm. in diameter, the thickness of the covering skin being 0.2 to 3 mm., preferably 0.5 to 2 mm., the overall thickness of the panel being from 2.5 to 25 mm., preferably from 5 to 15 mm., the average density of the panel being 0.2 to 0.9 g. per cc. preferably 0.3 to 0.7 g. per cc. and the relationship of impact strength in Joules (S) to weight per unit area (W) in g. per square cm. being such that $$\frac{\log_{10} S}{W} > 2$$

The expression "nylon material" refers to thermoplastic polymers of molecular weight above 10,000 and Vicat softening point 150° to 300° obtained essentially by the condensation of diamines with dicarboxylic acids and/or self condensation of amino acids or lactams, the said polymers having monomer units of the formulae

—NH—R—NH—CO—R′—CO— and/or

—CO—R″—NH— wherein R and R′ may represent straight or branched chain alkylene radicals of 4–13 carbon atoms, m- or p-phenylene radicals or 1,4-cyclohexylene radicals or additionally R′ may represent a direct linkage, and R″ may represent a straight chain alkylene radical of 3 to 5 carbon atoms or a 1,4-cyclohexylene radical. It will be understood that the nylon material may be a polymer in which there is regular repetition of monomer units or a polymer containing any number of different monomer units.

A preferred type of "nylon material" is nylon 6.6/6.iP (a copolymer from hexamethylene diamine adipate and hexamethylene diamine isophthalate), especially such material having a Vicat softening point above 240° C. Another preferred type of "nylon material" is nylon 6 (polycaprolactam).

Nylon material comprising the skin of the panels may be identical with or different from that comprising the foamed core.

The foamed core and more particularly the skin may contain other materials, for example pigments, fillers, fibres (e.g. glass fibre) or plasticisers; the skin may advantageously contain a mould release agent and the foamed core may contain a nucleating agent to assist the formation of bubbles.

When the panels of the invention are substantially free from fillers, more particularly in the skin, they should preferably have a weight per unit area of 0.25 to 1.15 g. per sq. cm., especially 0.35 to 0.70 g. per sq. cm. The impact strength of such panels (measured on a dry as-moulded speciment at 25° C. by British Standard 2782 Method 306B) is high, being for example not less than 10J when the weight per unit area is 0.5 g. per sq. cm.

The nylon panels of the invention are light in weight but have very good strength. They have potential for the construction of load-bearing structures in the building and furniture industries. For such purposes they can, if desired, be formed with ribs, ridges or other similar formations to provide added strength, and with linking or fixing lugs or other features. The panels may also form part of moulded articles such as trays, boxes, tanks, articles of furniture, interior car trims and car body panels.

According to a further feature of the invention a process for the manufacture of a panel comprises injecting into panel forming mould cavity of adjustable thickness a sufficient amount of nylon material as hereinbefore defined to form skin of thickness 0.2 to 3 mm., preferably 0.5 to 2 mm. and subsequently, and before the central portion of the said nylon material has set, injecting into the charge of the nylon material that is in the mould cavity a foamable nylon material composition as hereinafter defined the amount of foamable nylon material composition being such as will provide, with the skin, a panel of average density of 0.2 to 0.9 and preferably 0.3 to 0.7 g. per cc. when expansion to an overall thickness of 2.5 to 25 and preferably 5 to 15 mm. has taken place, and the initial thickness of the mould being adjusted so that the nylon material and foamable nylon material composition charged thereto together fill the mould before any foaming occurs, the said foamable nylon material composition being at a temperature at or above the activating temperature of the blowing agent, and thereafter enlarging the mould to an overall thickness of 2.5 to 25 mm., preferably 5 to 15 mm., and maintaining the material within the cavity for sufficient time to cause the foamable nylon material composition to foam and thereby fill the enlarged mould and the skin to set.

The foamable nylon material compositions which are used in the process of the invention comprise nylon material as hereinbefore defined and one of the following types of blowing agents:

(i) An oxalic acid derivative wherein one COOH group has been esterified with an alcohol or polyol and the other has been esterified with an alcohol, polyol or phenol or converted to a substituted amide group. The manufacture of polyamide foam using this type of blowing agent is described and claimed in our copending U.K. application No. 2,245/70 which also provides specific examples of such blowing agents.

(ii) An oxyacid of phosphorus and a metal salt of a carboxylic acid, said metal salt being substantially stable at temperatures within the working range of the nylon material (i.e. above the melting point but below the decomposition temperature) but the carboxylic acid from which it is derived being one which decarboxylates at temperatures within the said working range. The manufacture of nylon foam using this type of blowing agent is described and claimed in our copending U.K. application No. 18,475/70 which also provides specific examples of such blowing agents.

(iii) A carboxyl-substituted heterocyclic compound which decarboxylates in the presence of the molten nylon material. The manufacture of nylon foam using this type of blowing agent is described and claimed in our copending U.K. application No. 56,404/69 which also provides specific examples of such blowing agents.

Blowing agents of the above type (i) used in the process of the invention may comprise an oxalic acid derivative of the formula

RO—CO.CO—X wherein R is an aliphatic radical and X is a radical of the formula —OR, —OAr (where Ar is an aromatic radical) or —NR$_1$R$_2$ where R$_1$ is an aliphatic or aromatic radical, R$_2$ is hydrogen or an aliphatic or aromatic radical, or R$_1$ and R$_2$ together represent the atoms necessary to form a heterocyclic group together with or excluding the amide nitrogen atom.

In the oxalic acid derivatives of the above formula: the radical R may be, for example, a straight or branched chain alkyl radical, particularly of from 1 to 12 carbon atoms e.g. methyl, ethyl, lauryl (such radicals may be substituted, for example by hydroxy or alkoxy e.g., methoxy groups):

an aryl radical represented by Ar may be for example phenyl or tolyl:

aliphatic radicals represented by R$_1$ and R$_2$ may be for example alkyl radicals, particularly or from 1 to 6 carbon atoms e.g. methyl, ethyl, propyl or butyl:

aryl radicals represented by R$_1$ and R$_2$ may be for example phenyl or tolyl:

heterocyclic radicals formed by R$_1$, R$_2$ and the nitrogen atom may be for example piperidyl:

heterocyclic radicals formed by R$_1$ and R$_2$ may be for example triazinyl.

Specific blowing agents of the above formula are:

n-C$_4$H$_9$OCO.CONH(CH$_2$)$_6$NHCO.COOC$_4$H$_9$(n) --- I
C$_2$H$_5$OCO.CONH(CH$_2$)$_6$NHCO.COOC$_2$H$_5$ ------- II
CH$_3$OCH$_2$CH$_2$OCO.COOCH$_2$CH$_2$OCH$_3$ --------- III
CH$_3$(CH$_2$)$_3$CH(C$_2$H$_5$)CH$_2$OCO.
            COOCH$_2$CH(C$_2$H$_5$) (CH$_2$)$_3$CH$_3$ ---- IV
C$_{12}$H$_{25}$OCO.COOC$_{12}$H$_{25}$ ---------------------- V
C$_2$H$_5$OCO.CONHC$_6$H$_5$ ---------------------- VI
C$_2$H$_5$OCO.COOC$_6$H$_4$OCO.COOC$_2$H$_5$ ---------- VII

It is preferred in the process of the invention to employ as blowing agent of type (i) an ester formed by esterification of oxalic acid with a polyol, particularly ethylene glycol. Esters made in this way are mainly polymeric and may contain several individual compounds. Mixtures of esters produced by the direct esterification process may be used, such mixtures being for convenience designated polyesters. Thus for example the product obtained by esterifying oxalic acid with ethylene glycol is designated poly(ethylene oxalate).

The proportion of such blowing agents relative to polyamide may be for example from 0.1 to 10% by weight depending upon the particular blowing agent and polyamide used and the density of foam wanted. In general proportions of 0.5 to 3% by weight are preferred.

Blowing agents of the above type (ii) which may be used in the process of the invention may incorporate the following oxyacids of phosphorus:

Hypophosphorous acid;
Alkyl phosphorous and dialkylphosphorous acids;
Phosphorous acid;
Alkyl-, cycloalkyl- and aryl-phosphoric acids and their monoalkyl, or monocycloalkyl and monoaryl esters;
Orthophosphoric acid;
Phosphoric acids having a lower H$_2$O:P$_2$O$_5$ ratio than orthophosphoric acid e.g. metaphosphoric acid, pyrophosphoric acid, hexametaphosphoric acid and trimetaphosphoric acid;
Partial esters of phosphoric acids with alcohols or phenols, e.g. diethyl orthophosphate and monoglycero-orthophosphate.

Although any metal salt having the specified characteristics may be used in blowing agents of type (ii) salts of the following metals are preferred:

Metals in Groups 1–A and II of Mendeleef's Period System; rare earth metals: gallium, indium, thallium, lead, manganese, iron, cobalt, nickel.

Especially preferred are salts of sodium potassium.

Desirably the metal salt should be in a finely divided state.

In a particular class of carboxylic acids having the above prescribed requirement, a carboxylic acid group is activated by proximity to an electron attracting group, particularly a ketone group or a carboxylic acid or ester group.

Specific carboxylic acids of this type are oxalic acid, malonic acid, and its monoethyl ester, oxomalonic acid, citric acid.

The extent of foaming which occurs by use of blowing agents of type (ii) is predetermined by the amounts of phosphorus oxyacid and metal salt which are caused to react in the molten polymer. Although it is not necessary to have the reactants present in stoichiometric amounts it is advantageous to at least utilise the full blowing power of the acid by having present a slight excess of the metal salt. Subject to these preferences there may be used for example from 0.5 mole percent to 5 mole percent of oxyacid of phosphorus and from 0.5 mole precent to 10 mole percent of metal salt, based on the polyamide.

Blowing agents of type (iii) which may be used in the process of the invention are of the formula X—COOH where X is a heterocyclic residue. Decarboxylation takes place according to the scheme:

X—COOH—XH+CO$_2$ thus releasing gaseous carbon dioxide which blows the polymer into a foam. Polycarboxylic acids can advantageously be used, since these produce a relatively greater amount of carbon dioxide.

Preferred blowing agents of type (iii) are carboxyl-substituted heterocyclic compounds which decarboxylate substantially completely on heating to a temperature of 150° to 320° C. especially 200 to 290° C.

Carboxyl-substituted heterocyclic compounds containing at least one cyclic nitrogen atom are especially effective as blowing agents. Examples of such compounds are mono-, di- and tri-carboxy imidazoles and pyrazoles, particularly imidazole-4,5-dicarboxylic acid and pyrazole-4,5-dicharboxylic acid.

The proportion of such blowing agents relative to thermoplastic polymer may be for example from 0.1 to 10% by weight depending upon the particular blowing agent and polymer used and the density of foam wanted. In general proportions of 0.5 to 3% by weight are preferred.

Advantageously the foamable nylon material compositions used in the process of the invention may also contain a surface active agent, preferably of the non-ionic type, in order to preserve a fine dispersion of gas bubbles during the transition to rigid foam. The use of surface active agents in the production of polyamide foams is within the claims of our United Kingdom Pat. No. 1,208,782. Some of the most effective surface active agents are long chain alkylphenols, alkanols or alkylamines containing at least 6 carbon atoms, and condensates thereof with an alkylene oxide preferably containing from 1 to 30 moles of alkylene oxide. Especially effective surface active agents are alkanols containing 10 to 20 carbon atoms e.g. cetyl alcohol and condensates of such alcohols with up to 6 moles of an alkylene oxide e.g. ethylene oxide per mole of alkanol. The product of this type which is sold by Imperial Chemical Industries Limited under the name Lubrol MOA (Registered Trademark) is particularly effective. Other especially surface active agents are condensates of alkylamines, containing 10 to 20 carbon atoms, with up to 5 moles of an alkylene oxide, e.g. ethylene oxide per mole of alkylamine. The product of this type which is sold by Armour Hess Chemicals Limited, under the name Ethomeen S/12 is particularly effective.

The process of the invention may be carried out in the various ways which are described in our published United Kingdom patent specification No. 1,156,217. Panels produced thereby are found to have the characteristics hereinbefore defined.

In our preferred method of manufacture the foamable nylon material composition is injected into the mould at such high speed and under such high pressure that foaming is substantially prevented until the mould cavity is filled, and the mould cavity is enlarged after the injection of all the charges to cause the foamable nylon material composition to foam. The mould cavity may be enlarged instantaneously or gradually either by reducing the locking forces on the mould so that it is enlarged by the forces generated by the decomposition of the blowing agent or by mechanical opening of the mould. Standard injection moulding conditions have been found to be satisfactory for the operation of this process.

In a further embodiment after a sufficient amount of nylon material to form the skin has been injected into the mould the two halves of the mould may be urged together to distribute the material to the extremities of the mould cavity and the charge of the foamable nylon material composition then injected. If the first charge is not distributed to the extremities of the mould cavity a line tends to be formed in the surface of the moulding corresponding to the position of the edge of the first charge within the mould cavity prior to the injection of the next charge of material.

In a further preferment of our process for manufacturing the panels of the present invention a second charge of the skin-forming nylon material is injected into the mould after the charge of the foamable nylon material composition. This preferred process has two advantages; firstly it ensures that any material remaining in the sprue of the moulding machine after the first moulding cycle is of the skin forming polymer and thus prevents the materials from mixing during the next moulding cycle and secondly ensures that when the sprue is cut away from the moulding, an unfoamed and not a foamed area is exposed.

The invention is illustrated but not limited by the following examples in which all parts and percentages are by weight unless otherwise stated. Relative viscosity values are as measured at 25° C. on an 8.4% solution in aqueous formic acid of 90% strength.

The following abbreviations are used:

nylon 6—polycaprolactam
nylon 6.6—polyhexamethyleneadipamide
nylon 6.12—polyhexamethylenedodecandiamide
nylon 6.10—polyhexamethylenedecandiamide
nylon 6.6/6.iP—copolymer from hexamethylenediamine adipate and hexamethylenediamine isophthalate
nylon 6.6/6/6.10—copolymer from hexamethylenediamine adipate caprolactam and hexamethylenediamine decandoic acid salt.

EXAMPLE 1

Granules of 6.6/6.iP nylon random copolymer (composed of 90 parts hexamethyleneadipamide units and 10 parts hexamethyleneisophthalamide units and containing 1.5 mole percent of orthophosphoric acid) having a relative viscosity of 40, were dried in vacuo for 24 hours and subsequently coated with 1½% Lubrol MOA and 1½% finely divided sodium oxalate by tumbling.

Using the procedure described in United Kingdom Pat. No. 1,156,217, uncoated nylon 6.6/6.iP (90:10) copolymer granules sufficient to fill one half of the barrel were fed to a 500 g. injection moulding machine and allowed to reach the front of the barrel. The remainder of the barrel was then filled with the coated nylon copolymer granules. The temperature along the barrel ranged from 250° C. at the feed end to 280° C. at the nozzle.

The complete charge was then injected into a 45 cm. diameter disc mould which had a cavity 3 mm. wide and allowed to cool therein for 1 second. The pressure holding the mould was then reduced and the mould allowed to open so that the cavity became 6 mm. wide. The sample was allowed to cool before the mould was completely opened and the sample removed.

A moulding having a surface skin 1 mm. thick sandwiching a foamed core 4 mm. thick was obtained, with overall average density of 0.55 g. cc. and impact strength 5J. Foam structure was fine and even, with average pore size less than 0.3 mm. In this example, the maximum injection pressure (ca. 1000 kg./cm.$^2$) and rate settings on the moulding machine were used and injection was complete in 4½ seconds. The charge of nylon material injected was such as to fill the mould completely with substantially unfoamed material before relieving the pressure holding the mould and allowing it to expand.

By the procedure of this example mouldings with similar properties may be obtained from nylon 6.12 and nylon 6.10 i.e. (polyhexamethylene dodecandiamide and polyhexamethylene decandiamide).

EXAMPLE 2

A copolymer of nylon 6.6 and hexamethylene isophthalamide of molar proportions 90:10 and of relative viscosity 43 was dried in vacuo at 100° C. for 24 hours. It was then tumble blended with a silica nucleant (0.2% by weight) and poly-(ethylene oxalate) (2% by weight; material which had passed through a 30 mesh screen). Lubrol MOA (2% volume/weight) was then added and tumble blended with the coated chips. The chips coated with a surfactant, blowing agent and nucleant were then further dried in a vacuum oven at 80° C. for 16 hours.

The coated chips were fed into one barrel of a two-shot injection moulding machine. The barrel temperatures, registered by thermocouples were 250° C. (rear), 260° C. (middle) and 275° C. (front). Into the second barrel of the injection moulding machine was fed a dried copolymer of nylon 6.6 hexamethylene isophthalamide (of molar proportions 90/10 and of relative viscosity 43). The untreated copolymer and the foamable composition were injection moulded by the technique described in United Kingdom specification No. 1,156,217 to give panels with non-foamed skin and a foamed core. The mouldings were about 1 cm. thick with skin thickness 0.5 to 1.1 mm. and average density 0.48 g./cc. They had impact strengths of about 10J. Foam structure was very fine, with an average pore size of less than 0.1 mm.

As in Example 1, the maximum injection pressure and rate settings on the moulding machine were employed and injection was complete in 5½ seconds. Similarly, the total charge of foamable and non-foamable polymer was sufficient to fill the mould completely prior to expansion.

EXAMPLE 3

Dry nylon 6.6 polymer chip, of relative viscosity 45, was tumble blended with a silica nucleant (0.4%), poly(ethylene oxalate) (2%) and Ethomeen S/12 (1.5%). Nylon powder (0.6%) was also added to improve the flow of the polymer granules.

This foamable material was used to prepare foamed core panels in the mannner described in Example 2; the skin polymer was the 90/10 6.6/6.iP copolymer used in that example.

Mouldings were obtained having a somewhat coarser foam structure than those obtained in Example 2 with a larger proportion of pores of greater than 1.5 mm. Average pore size was less than 0.2 mm. The mouldings had a total thickness 12 mm., wtih skin thickness in the range 0.5–1.2 mm., and average density 0.43 g./cc., and impact strengths of about 11J.

Mouldings with similar properties may be made in a similar manner using the copolyamide prepared from oxalic acid and a mixture of the diamines hexamethylenediamine, 2,2,4-trimethylhexamethylenediamine and 2,4,4-trimethylhexamethylenediamine (molar ratio 60:20:20).

EXAMPLE 4

The same foamable composition described in Example 2 was used, with the same moulding conditions, but nylon 6 polymer was used in the second barrel of the injection moulding machine with temperatures 30° C. lower along the barrel. The sequence of operations on the moulding machine was arranged so that after injection of the foamable composition a further small quantity of nylon 6 polymer was injected from the second barrel of the machine, thus purging foamable material from the sprue. In this way, when the sprue was cut from the moulding an unfoamed area was exposed and a continuous surface of 6-nylon was maintained.

With this combination mouldings were made having essentially a nylon 6 skin and a 6.6/6.iP copolymer foamed core. The mouldings of total thickness 10 mm., skin thickness 0.7–1.0 mm., and average density 0.5 g./cc., had impact strength of 10 to 11J. Mean pore size of the foam was similar to that in Example 2.

EXAMPLE 5

Dry nylon 6 polymer was tumble blended with a silica nucleant (0.4%), poly(ethylene oxalate) (2%), Ethomeen S/12 (1.5%) and nylon 6 powder (1%) to produce a foamable composition.

Both barrels of the two-shot injection moulding machine were heated to 220° C. (rear), 235° C. (middle) and 250° C. (front). The foamable composition was fed to one barrel and similar but uncoated nylon 6 chip was fed to the other.

Using the technique described in previous examples mouldings were made having a nylon 6 skin and a nylon 6 foamed core. Foam structure was similar to that obtained with the 6.6/6.iP copolymer described in Examples 2 and 4 but with a higher proportion of larger pores including a few with diameter of greater than 2 mm. The impact properties of the mouldings however were good averaging about 20J for a panel of total thickness 10.1 mm., skin thickness 0.6 to 1.0 mm., and average density 0.46 g./cc.

EXAMPLE 6

Chips of a nylon 6.6/6/6.10 (40:30:30) copolymer were tumble blended with a silica nucleant (0.4%), poly(ethylene oxalate) (2%) and Ethomeen S/12 (1.5%). This foamable composition was fed to one barrel of a two-shot moulding machine having barrel temperatures set to 155° C. (rear), 184° C. (middle), 194° C. (front).

At the same time the 6.6/6.iP (90:10) copolymer described in Example 2 was fed to the second barrel of the machine under the temperature conditions given there.

By the procedure described in previous examples mouldings were obtained having a 6.6/6.iP copolymer skin and a 6.6/6/6.10 copolymer foamed core. The basic foam structure was very fine with mean pore size less than 0.05 mm. though there were some small voids measuring 2 to 3 mm. distributed throughout the mouldings. Impact properties of the panels were excellent; test pieces from a panel of total thickness 13.3 mm., skin thickness 0.8–1.1 mm., average density 0.41 g./cc. survived impacts of 50J.

EXAMPLE 7

Granules of 90:10 6.6/6.iP copolymer were tumble blended with a silica nucleant (0.2%), imidazole-4,5-dicarboxylic acid (2%) and Lubrol MOA (1.5%).

This foamable composition was fed to one barrel of a two-shot injection moulding machine, whilst untreated nylon 6.6, pigmented with 0.5% carbon black was fed to the other. Temperatures were similar to those used in Example 2.

By the procedure described in previous examples mouldings were obtained with a black nylon 6.6 skin and a white nylon 6.6/6.iP foamed core. Foam structure was rather coarse and uneven with mean pore size about 0.3 mm.; there was a considerable proportion of pores about 1 mm. in diameter. Skin thickness was also above average, in the range 0.8 to 2 mm. Impact properties of the panels were good, a panel of thickness 10 mm. and average density 0.47 g./cc. having an impact strength of 20J.

EXAMPLE 8

Using the foamable composition of Example 2, but as skin polymer a standard grade of nylon 6.6 containing 30% short glass fibre, mouldings were made as described in Example 2 but having a glass-filled nylon 6.6 skin. It was necessary to use temperatures set about 10° C. higher in the barrel containing the skin polymer. The mouldings were similar in structure but with enhanced rigidity compared with those made with an unfilled skin. The impact strength of a panel of 9.1 mm. thick, with skins 1 mm. thick, average density 0.49 g./cc. was 8J. Foam structure was similar to that in Example 2.

What I claim is:

1. A panel of nylon material defined as thermoplastic polymer of molecular weight above 10,000 and Vicat softening point of 150° to 300° C., said polymer being selected from the group consisting essentially of (1) a condensation polymer of diamine with dicarboxylic acid, (2) self condensation of a material selected from an amino acid, a lactam and mixtures thereof, and (3) mixtures of (1) and (2), said polymer having monomer units selected from the group consisting of the formulae:

and

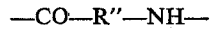

and mixtures thereof wherein R and R' represent straight or branched chain alkylene radicals of 4–13 carbon atoms, m- or p-phenylene radicals or 1,4-cyclohexene radicals or additionally R' may represent a direct linkage, and R" may represent a straight chain alkylene radical of 3 to 5 carbon atoms or a 1,4-cyclohexylene radical, said panel comprising a core of such nylon material in foam form and a covering skin of such nylon material formed integrally with the core, the foam having an average pore diameter of less than 1.5 mm. and being substantially free from pores greater than 3 mm. in diameter, the thickness of the covering skin being 0.2 to 3 mm., the overall thickness of the panel being from 2.5 to 25 mm. and the average density of the panel being 0.2 to 0.9 g. per cc. and the relationship of the impact strength (S) in Joules to the weight per unit area (W) in g. per square cm. being such that $$\frac{\log_{10} S}{W} > 2$$

2. A panel according to claim 1 wherein the nylon material is a copolymer from hexamethylenediamine adipate and hexamethylenediamine isophthalate, preferably with a Vicat softening point about 240° C.

3. A panel according to claim 1 wherein the nylon material is polycaprolactam.

4. A panel according to claim 1 substantially free from fillers and having a weight per unit area of 0.25 to 1.15 g. per sq. cm., preferably 0.35 to 0.70 g. per sq. cm.

5. A panel according to claim 2 substantially free from fillers and having a weight per unit area of 0.25 to 1.15 g. per sq. cm., preferably 0.35 to 0.70 g. per sq. cm.

6. A panel according to claim 3 substantially free from fillers and having a weight per unit area of 0.25 to 1.15 g. per sq. cm., preferably 0.35 to 0.70 g. per sq. cm.

7. A panel as claimed in claim 1 wherein the covering skin is free of blowing agent.

References Cited

UNITED STATES PATENTS 3,249,561   5/1966   Hendrix _____ 161—161

WILLIAM A. POWELL, Primary Examiner

J. J. BELL, Assistant Examiner

U.S. Cl. X.R.

156—78; 161—165, 227; 264—45